(12) United States Patent
Hey et al.

(10) Patent No.: US 10,184,460 B2
(45) Date of Patent: Jan. 22, 2019

(54) CUSPED-FIELD THRUSTER

(71) Applicant: Airbus Defence and Space GmbH, Taufkirchen (DE)

(72) Inventors: Franz Georg Hey, Weingarten (DE); Ulrich Johann, Salem (DE); Guenter Kornfeld, Elchingen (DE)

(73) Assignee: Airbus Defence and Space GmbH, Taufkirchen (DE)

(*) Notice: Subject to any disclaimer, the term of this patent is extended or adjusted under 35 U.S.C. 154(b) by 0 days.

(21) Appl. No.: 15/912,673

(22) Filed: Mar. 6, 2018

(65) Prior Publication Data
US 2018/0266403 A1 Sep. 20, 2018

(30) Foreign Application Priority Data
Mar. 20, 2017 (DE) .................. 10 2017 204 590

(51) Int. Cl.
*F03H 1/00* (2006.01)
*B64G 1/40* (2006.01)

(52) U.S. Cl.
CPC ........... *F03H 1/0068* (2013.01); *B64G 1/405* (2013.01)

(58) Field of Classification Search
CPC ........ F03H 1/00; F03H 1/0006; F03H 1/0068; H01J 27/146
See application file for complete search history.

(56) References Cited

U.S. PATENT DOCUMENTS

| | | | |
|---|---|---|---|
| 6,448,721 B2 | 9/2002 | Raitses et al. | |
| 8,304,744 B2 | 11/2012 | Madocks | |
| 2002/0014845 A1* | 2/2002 | Raitses | F03H 1/0068 315/111.81 |
| 2004/0173741 A1 | 9/2004 | Bateman | |
| 2004/0183452 A1 | 9/2004 | Kornfeld et al. | |
| 2005/0174063 A1 | 8/2005 | Kornfeld et al. | |
| 2005/0212442 A1 | 9/2005 | Kornfeld et al. | |

FOREIGN PATENT DOCUMENTS

| | | |
|---|---|---|
| CN | 105736272 | 7/2016 |
| DE | 10130464 | 1/2003 |
| DE | 10153723 | 5/2003 |
| DE | 10357498 | 7/2004 |
| DE | 10300776 | 9/2004 |

(Continued)

OTHER PUBLICATIONS

Courntey Development and Characterization of a Diverging Cusped Field Thruster and a Lanthanum Hexaboride Hollow Cathode 2008.*

(Continued)

*Primary Examiner* — Gerald L Sung
*Assistant Examiner* — William Breazeal
(74) *Attorney, Agent, or Firm* — Greer, Burns & Crain, Ltd.

(57) ABSTRACT

A cusped-field thruster for a space system, wherein the cusped-field thruster comprises: at least two substantially annular permanent magnets arranged in an antipolar manner, wherein a magnetic pole piece is formed between the permanent magnets, and an anode, which comprises a permanent-magnetic material. The cusped-field thruster is configured such that a cusp is formed in a region adjacent to the anode of the cusped-field thruster.

6 Claims, 4 Drawing Sheets

(56) References Cited

FOREIGN PATENT DOCUMENTS

EP      2103198  A1   9/2009
WO   2008071287 A1   6/2008

OTHER PUBLICATIONS

German Search Report, dated Nov. 29, 2017, priority document.
"Manuel: Diverging cusped-field hall thruster (DCHT)". In proceedings of the 30th International Electric Propulsion Conference (IEPC), Sep. 17-20, 2007.
Matlock et al., "Controlling Plume Divergence in a Cusped-Field Thruster", IEPC-2011-178.
Matyash et al., "Comparison of SPT and HEMP thruster concepts from kinetic simulations", IEPC-2009-159.
European office action for corresponding patent application No. 18153413.2 dated Aug. 2, 2018.

* cited by examiner

ID THRUSTER

CROSS-REFERENCES TO RELATED APPLICATIONS

This application claims the benefit of the German patent application No. 10 2017 204 590.6 filed on Mar. 20, 2017, the entire disclosures of which are incorporated herein by way of reference.

BACKGROUND OF THE INVENTION

The invention relates to a cusped-field thruster for a space system and to a method for generating a thrust on a space system.

Electric thrusters have been under development for several decades by various companies and universities, for example for use in a space system.

Plasma accelerator configurations are described, for example, in DE 101 30 464 A 1 and in DE 103 00 776 B3.

Another plasma accelerator configuration is described, for example, in DE 101 53 723 A 1, wherein for the plasma accelerator configuration a multistage construction is disclosed with at least one intermediate electrode between electrodes enclosing a plasma chamber between them. Due to this so-called "high efficiency multistage plasma thruster" (HEMPT), increased efficiency is achieved by an uneven potential distribution to the potential stages formed by the plurality of electrodes with a high potential difference of the last stage on exit of the plasma jet and by a special design of a magnetic field permeating the plasma chamber in this last stage.

In U.S. Pat. No. 6,448,721 B2, an arrangement and a method for a plasma thruster are described that utilize a so-called Hall thruster with a cylindrical geometry. It is portrayed that this arrangement is suitable for operation with low energy. Efficient operation is accomplished in this case by magnetic fields with a generally radial component.

Other prior art is found, for example, in CN 105736272 A; in Courtney et al., "Diverging Cusped-Field Hall Thruster (DCHT)," IEPC-2007-39; in Matlock et al., "Controlling Plume Divergence in a Cusped-Field Thruster," IEPC-2011-178; and in Matyash et al., "Comparison of SPT and HEMP thruster concepts from kinetic simulations," IEPC-2009-159.

FIG. 1 (from Matyash et al., "Comparison of SPT and HEMP thruster concepts from kinetic simulations," IEPC-2009-159) shows schematically a system of a cusped-field thruster 100 according to the prior art.

The cusped-field thruster 100 consists in this case of a plurality of magnets, the magnetic south poles and magnetic north poles of which are arranged respectively in an antipolar manner A cathode 102 emits electrons for the discharge ignition, wherein the electrons further neutralize the xenon ion beam.

Xenon gas is admitted to the discharge chamber of the cusped-field thruster 100. In this example, a voltage between 300 V and 2000 V is then applied between the cathode 102 and the anode 104.

The xenon particles are ionized and then accelerated through the electric field. After the passage through the neutralizer (cathode 102), which supplies electrons to the ion beam again and thus renders it electrically neutral again, the neutralized particles are ejected in the form of a beam (see right-hand part of FIG. 1).

The cathode 102 as neutralizer here prevents charged particles from moving back to the space system in an arc.

As is to be seen in FIG. 1, the ionized xenon gas is accelerated through the magnetic field, which forms so-called cusps in this case, along the symmetry axis of the thruster.

FIG. 2 shows schematically another system of a cusped-field thruster 200 according to the prior art.

As in the cusped-field thruster shown in FIG. 1, in the cusped-field thruster 200 ionized xenon particles are accelerated along the axis of symmetry through the electric field, which is formed between the cathode 202 and the anode 204.

In contrast to the cusped-field thruster in FIG. 1, the magnetic field lines that are generated by the magnets 206 run parallel to the symmetry axis of the thruster in the region in front of the anode 204.

SUMMARY OF THE INVENTION

In space research, simple microthrusters that operate in the micro-Newton range were developed for future research missions but also for small satellite constellations. The research and development carried out was based here, in particular, on the aforesaid HEMPT concept. However, it has turned out that a relatively small thruster based on the HEMPT concept cannot be operated very efficiently in comparison with a larger HEMPT thruster. In the case of geometrically relatively small thruster external dimensions of approx. 30 mm and smaller, in particular, the efficiency of the thruster is sharply reduced, the discharge unstable and the thrust range very small.

An object of the invention is to provide a cusped-field thruster of the type described at the beginning of this document that permits improved efficiency.

To this end, the invention comprises a cusped-field thruster for a space system, wherein the cusped-field thruster comprises:

at least two substantially annular permanent magnets arranged in an antipolar manner, wherein a magnetic pole piece is formed between the permanent magnets; and an anode, which comprises a permanent-magnetic material;

wherein the cusped-field thruster is configured in such a way that a cusp is formed in a region adjacent to the anode of the cusped-field thruster.

The magnetic field is changed in this case in such a way that a further axial cusp is located directly on the thruster anode at the end of the thruster channel.

The anode can consist completely of a permanent-magnetic material. Alternatively, to this, only a part of the anode can comprise of a permanent-magnetic material. For example, according to some embodiments, an inner core region of the anode can comprise of a permanent-magnetic material and/or the surface or a surface region of the anode can be manufactured from a permanent-magnetic material.

The permanent-magnetic material can comprise a ferrimagnetic or ferromagnetic material here.

The substantially annular structure of the at least two permanent magnets arranged in an antipolar manner here comprises structures in which the permanent magnets are annular, or have at least partially edged or angular structures, which do not adversely affect the functioning of the permanent magnets with regard to the shape of the magnetic field, however. In particular, the substantially annular design of the at least two permanent magnets arranged in an antipolar manner comprises any structures in which the magnets permit an implementation of a particle beam.

A preferred embodiment of the inventive cusped-field thruster for a space system provides that a diameter of the anode decreases in the direction of the region adjacent to the anode in which the cusp is formed. The anode can taper in this case, and be formed in a cylindrical shape, for example.

Another preferred embodiment of the inventive cusped-field thruster for a space system provides that the anode is formed as a fuel inlet of the cusped-field thruster. The anode can thus be used, according to some embodiments, both as an anode and as a pole piece and/or gas inlet.

Another preferred embodiment of the inventive cusped-field thruster for a space system provides that the cusped-field thruster further comprises a discharge chamber wall, which is arranged on a surface of the at least two substantially annular permanent magnets arranged in an antipolar manner and on a surface of the magnetic pole piece, wherein the surfaces face a discharge chamber of the cusped-field thruster.

The invention also comprises a method for generating a thrust on a space system, wherein the method comprises:

providing a cusped-field thruster according to an embodiment described herein;

admitting a fuel into a discharge chamber of the cusped-field thruster; and applying an electric voltage between the anode and an electron source.

Electrons are accelerated into the discharge chamber by this method. The electrons are confined in the discharge chamber by a magnetic field, which is generated by the at least two substantially annular permanent magnets arranged in an antipolar manner and the anode. The electrons ionize the fuel in the discharge chamber. The ionized fuel is then accelerated through an electric field so that the thrust on the space system is generated.

Let it be noted that steps b) and c) can also be executed in reverse order or simultaneously.

Xenon gas, for example, can be used as fuel.

A preferred embodiment of the method according to the invention for generating a thrust on a space system provides that the anode of the cusped-field thruster has a tapering profile, so that the magnetic field strength is focused at the anode.

BRIEF DESCRIPTION OF THE DRAWINGS

Exemplary embodiments of the invention are described in greater detail below with reference to the drawings.

DETAILED DESCRIPTION OF THE PREFERRED EMBODIMENTS

According to the invention described herein, the magnetic field inside the cusped-field thruster is changed in such a way that a further axial cusp is located directly on the thruster anode at the end of the thruster channel. The impedance of the thruster is increased by this and the loss cone of the electrons located in the thruster diminished to such an extent that substantially fewer electrons are lost. The thruster can thus be operated efficiently even with relatively small dimensions of approx. 30 mm and smaller.

In particular, it is achieved due to the anode, which comprises a permanent-magnetic material, that the thruster is characterized in that it runs very stably over a very wide thrust range (µN to mN) and has a high efficiency especially in the mN range (as compared with the HEMPT configuration described above).

Furthermore, the thruster according to the embodiments of the present invention starts reliably even with low anode potentials and with low mass flows, without special start algorithms (pressure surge, increase in anode voltage, etc.) being necessary.

Figure 3:
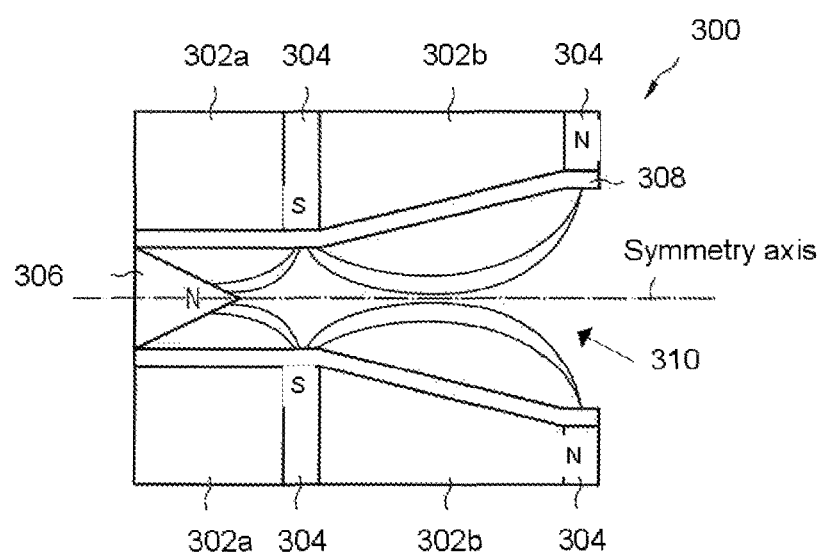
FIG. 3 shows schematically a cusped-field thruster according to an embodiment of the invention described herein.

FIG. 3 shows schematically a cusped-field thruster 300 according to an embodiment of the thruster according to the invention.

The cusped-field thruster 300 comprises, in this example, two permanent magnets 302a and 302b, between which a pole piece 304 is arranged (in this example a magnetic south pole is formed between the two permanent magnets 302a and 302b).

In this example, the anode 306 comprises a magnetic material, so that a further axial cusp is formed in a region in front of the anode 306.

The cusped-field thruster 300 further comprises a discharge chamber wall 308, which shields the magnets 302a, 302b and pole piece 304 from the discharge chamber 310.

In FIG. 3 the thruster configuration described is shown with three cusps. However, this can comprise fewer or more cusps depending on the number of pole pieces and magnets selected. The first cusp, with a predominantly axial component, is located directly in front of the anode and there prevents energetic electrons from being lost at the anode. The electron confinement in the discharge chamber is considerably improved by this.

As shown in FIG. 3, the other two cusps are formed directly in front of the pole pieces 304.

According to some embodiments, the pole pieces are manufactured from a ferromagnetic material. The magnet assembly, which comprises the magnets and pole pieces, is insulated from the plasma and from the anode in some variants of the thruster by a ceramic discharge chamber.

The anode, which comprises a magnetic material, is produced partly or entirely from a ferromagnetic material. In this example, the symmetry axis of the cylindrical anode coincides substantially with the symmetry axis of the thruster or of the permanent magnets 302a, 302b.

Figure 1:
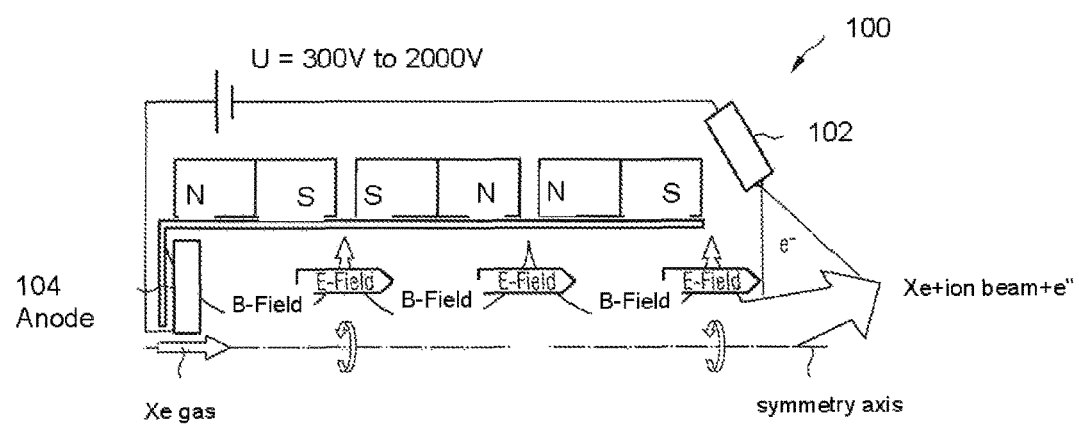
FIG. 1 shows schematically a system of a cusped-field thruster according to the prior art.
Figure 2:
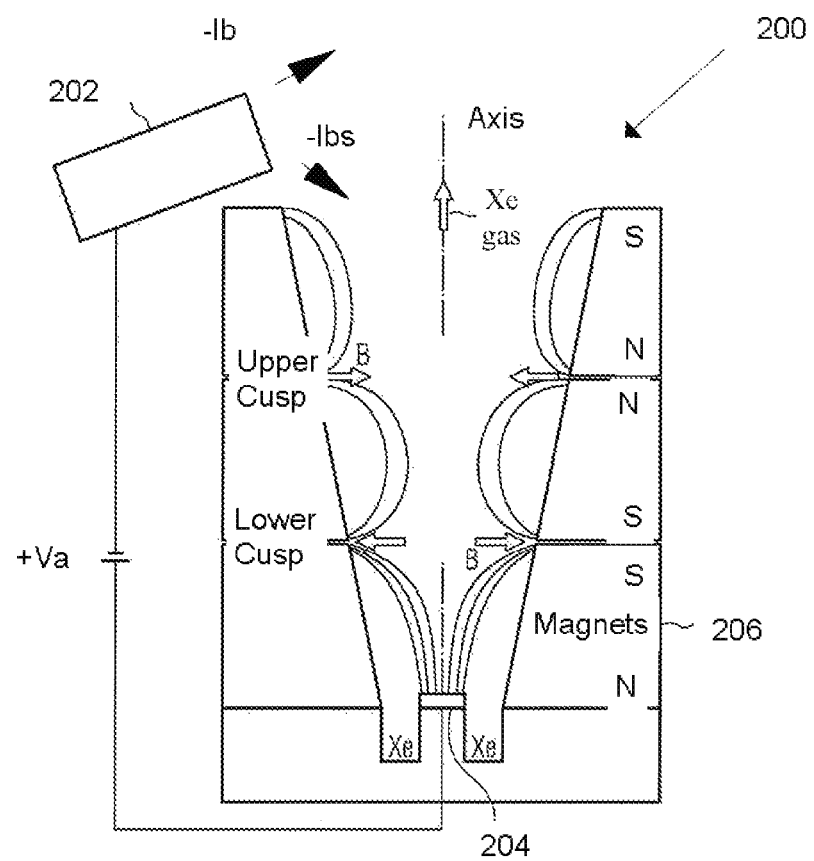
FIG. 2 shows schematically another system of a cusped-field thruster according to the prior art.

In comparison with an arrangement such as that shown in FIG. 2, for example, in which the anode does not comprise any permanent-magnetic material, the further axial cusp formed in a region in front of the anode leads in any inventive embodiments to the magnetic field strength being increased in the region in front of the anode. This in turn leads to better confinement of the electrons in front of the anode. This is accomplished, in particular, in that the anode itself is magnetic (or comprises a magnetic material). The inventive embodiments, in which the horizontal cusp is formed, differ herein from the HEMPT configuration, for example. The better confinement of the electrons accomplished by the inventive configurations in front of the anode by the field lines concentrated at the anode leads to an increased efficiency of the thruster, as fewer (or no) electrons are lost at the anode and these can then contribute to the ionization of the fuel gas.

The design of a tapering (for example, cylindrical) anode is particularly advantageous in this case, as the magnetic field strength is focused or concentrated at the anode itself by this and thus the effectiveness of the cusp in front of the anode is increased enormously (due to a lower loss of electrons at the anode).

Due to the inventive embodiments of the cusped-field thruster, an efficient thruster can be provided that has improved properties compared with the thrusters according to the prior art, such as, for example, an operation of the thruster, which is now possible in the low mN range.

Furthermore, the configuration of the inventive embodiments of the cusped-field thruster leads to relatively high efficiency (compared with the HEMPT design, for example). The special anode form also leads to improved starting behavior of the thruster.

The magnetic field created by the permanent magnets and pole pieces produces different cusps. In front of the anode and in front of the pole pieces the magnetic field has its maxima in the interior of the discharge chamber. The spacing of the magnetic field lines is therefore reduced there, which leads to a magnetic mirror and to electron confinement.

The integral function of the anode as anode, pole piece and gas inlet represents a preferred embodiment of the cusped-field thruster in this case, due to which a compact design of the thruster can be produced, for example.

Figure 4:
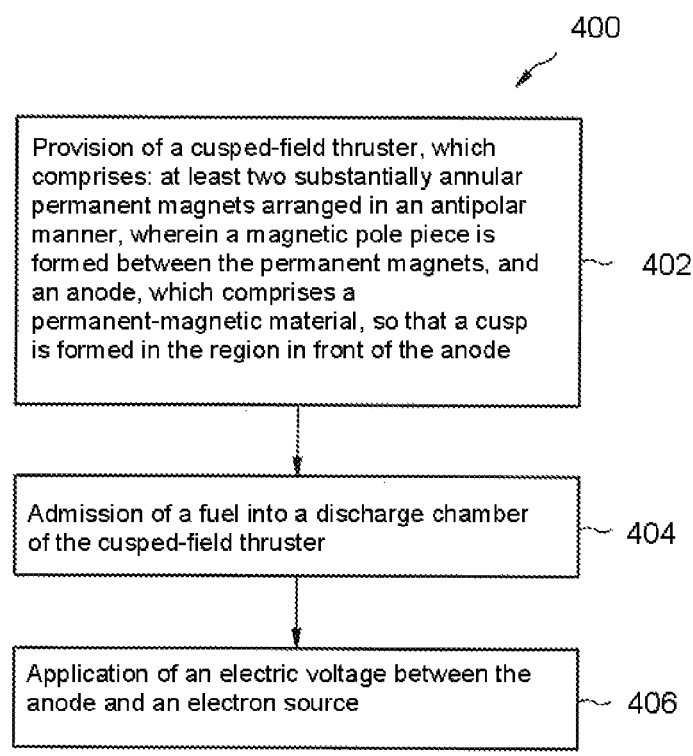
FIG. 4 shows a flow chart according to a method for generating a thrust on a space system, putting the cusped-field thruster described herein into operation.

FIG. 4 shows a flow chart according to a method for generating a thrust on a space system, putting the cusped-field thruster described herein into operation.

In step 402 a cusped-field thruster, such as described herein according to the different embodiments, is provided.

In step 404 a fuel is then admitted to a discharge chamber of the cusped-field thruster.

In step 406 an electric voltage is applied between the anode and an electron source. Electrons are accelerated into the discharge chamber by this, wherein the electrons are confined in the discharge chamber by a magnetic field, which is generated by the at least two permanent magnets arranged in an antipolar manner and the anode. The electrons here ionize the fuel in the discharge chamber. The ionized fuel is then accelerated through an electric field, so that the thrust is generated on the space system.

Steps 404 and 406 can also be executed in reverse order or simultaneously.

In some embodiments a high voltage (of 100 V to 6000 V, for example) can be applied between anode and the electron source, which can lie outside the thruster and is also termed cathode, to operate the thruster. The anode lying at the positive high voltage potential serves, according to some embodiments, also as a gas/fuel inlet into the discharge chamber.

The electrons absorb energy and migrate in the direction of the anode into the interior of the thruster, where they are confined by the magnetic field. The electrons can then ionize the fuel gas there. In some examples the ions are accelerated out of the thruster by the same electric field and generate thrust. Due to the high mass of the fuel ions, the magnetic confinement does not act (or only acts to an irrelevant, small extent) on the ions.

Finally, let it be pointed out, in particular, that the exemplary embodiments discussed above only serve to describe the instruction claimed, but do not limit this to the exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cusped-field thruster for a space system, wherein the cusped-field thruster comprises:
    at least two substantially annular permanent magnets arranged in an antipolar manner, wherein a magnetic pole piece is formed between the at least two substantially annular permanent magnets; and
    an anode, which comprises another permanent magnet, wherein the anode has a continuously tapering profile;
    wherein the cusped-field thruster is configured in such a way that a cusp of a magnetic field is formed in a region adjacent to the anode of the cusped-field thruster.

2. The cusped-field thruster according to claim 1, wherein the anode has a first end farthest from the cusp and a second end nearest the cusp, and wherein a diameter of the anode decreases in a direction from the first end to the second end.

3. The cusped-field thruster according to claim 1, wherein the anode is formed as a fuel inlet of the cusped-field thruster.

4. The cusped-field thruster according to claim 1, further comprising a discharge chamber wall, arranged on a surface of the at least two substantially annular permanent magnets arranged in the antipolar manner, wherein the surface faces a discharge chamber of the cusped-field thruster.

5. A method for generating a thrust on a space system, wherein the method comprises:
    providing a cusped-field thruster according to claim 1;
    admitting a fuel into a discharge chamber of the cusped-field thruster; and
    applying an electric voltage between the anode and an electron source to accelerate electrons into the discharge chamber, wherein the electrons are confined in the discharge chamber by the magnetic field, which is generated by the at least two substantially annular permanent magnets arranged in the antipolar manner and the anode, and wherein electrons in the discharge chamber ionize the fuel thereby generating ionized fuel;
    wherein the ionized fuel is accelerated through an electric field, so that the thrust is generated on the space system.

6. The method according to claim 5, wherein the a magnetic field strength is focused at the anode.

* * * * *